United States Patent [19]

von Knorring et al.

[11] 4,199,978

[45] Apr. 29, 1980

[54] METHOD AND APPARATUS FOR MEASURING MECHANICAL FORCES ON MACHINE OR SUPPORT ELEMENTS

[75] Inventors: Folke von Knorring; Sven F. Lindkvist; Lars S. Valdemarsson, all of Vasteras, Sweden

[73] Assignee: ASEA Aktiebolag, Vesteras, Sweden

[21] Appl. No.: 936,769

[22] Filed: Aug. 25, 1978

[30] Foreign Application Priority Data

Aug. 25, 1977 [SE] Sweden .............................. 77095362

[51] Int. Cl.² .............................................. G01L 1/12
[52] U.S. Cl. .................................................. 73/133 R
[58] Field of Search .................. 73/133 R, 141 A, 143

[56] References Cited

U.S. PATENT DOCUMENTS

| 3,620,074 | 11/1971 | Lamins et al. | 73/141 A |
| 3,695,096 | 10/1972 | Kutsay | 73/141 A X |

*Primary Examiner*—Jerry W. Myracle
*Attorney, Agent, or Firm*—Watson, Cole, Grindle & Watson

[57] ABSTRACT

Method and apparatus for measuring the resultant normal component of loading forces acting substantially perpendicular to the longitudinal axis of machine elements wherein a continuous hole is bored substantially along the longitudinal axis of the machine element; an elastic line extending substantially parallel to the longitudinal axis is arbitrarily selected and includes two spaced points, each of the points being symmetrically located with respect to the point of application of the loading forces; and mounting a transducer in the hole for measuring the change in the angle between the two tangents each extending through one of the spaced points. A transducer includes a measuring part and two expansionable attachment parts mounted at respective ends of the measuring part. Each attachment part includes means for securing the transducer in the hole within the machine element such that the measuring part extends substantially parallel to the longitudinal axis of the machine element.

10 Claims, 23 Drawing Figures

METHOD AND APPARATUS FOR MEASURING MECHANICAL FORCES ON MACHINE OR SUPPORT ELEMENTS

BACKGROUND OF THE INVENTION

The present invention relates to method and apparatus for measuring the normal component of forces influencing machine elements (such as short beams, short shafts etc., which are placed on two supports), substantially independently of any tangential components of the forces which may occur. An example of a field to which the invention is applicable is the load in crane cables to avoid overlapping, i.e. as overload protection.

SUMMARY OF THE INVENTION

According to the invention, the force measurement is carried out on a shaft which, for example, supports rope pulleys. A hole is bored in the longitudinal direction of the shaft. A transducer is inserted into the hole and clamped therein. The transducer is designed and clamped in such a way that the deformation of the shaft can be measured by measuring the angle between two tangents to an elastic line in the drilled wall. In this specification, the elastic line of a beam or shaft refers to an arbitrary line therein parallel to the central line of the beam or shaft. The two tangents have tangential points to the elastic line located symmetrically relative to a plane symmetrical with respect to the influencing forces.

BRIEF DESCRIPTION OF THE FIGURES

The objectives, advantages and theory of the measuring method and apparatus will be described with reference to the accompanying drawings wherein:

FIG. 2b shows the symmetrical deformation of an elastic line caused by the forces according to FIG. 2a;

FIG. 2c shows the symmetrical curvature of the cross-section caused by the forces of FIG. 2a;

FIGS. 3b and 3c show the respective anti-symmetrical deformations caused by the tangential forces of FIG. 3a;

FIGS. 4b and 4c show the deformations, and the sum of the symmetrical and anti-symmetrical deformations for the forces shown in FIG. 4a;

FIGS. 6b and 6c show the symmetrical deformations caused by the forces shown in FIG. 6a;

FIGS. 7b and 7c show the corresponding deformations to the forces shown in FIG. 7a;

DETAILED DESCRIPTION

Figure 1:
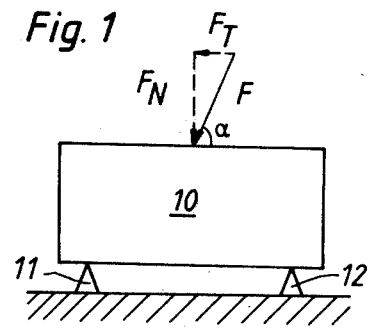
FIG. 1 shows a shaft supported on two firm supports and the force F to which the shaft is subjected.
Figure 2A:
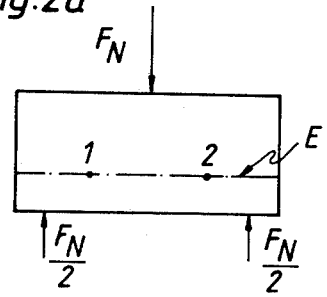
FIG. 2a shows the normal component of the influencing force as well as the reaction forces from the supports generated by the normal component.
Figure 2B:
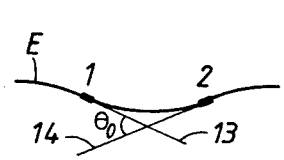
Figure 3A:
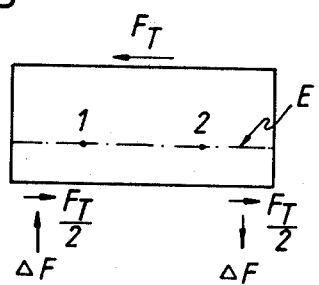
FIG. 3a shows the tangential forces on the shaft and the reaction forces from the supports.
Figure 3B:
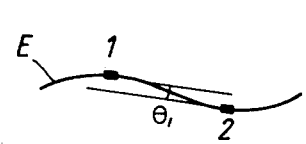
Figure 4A:
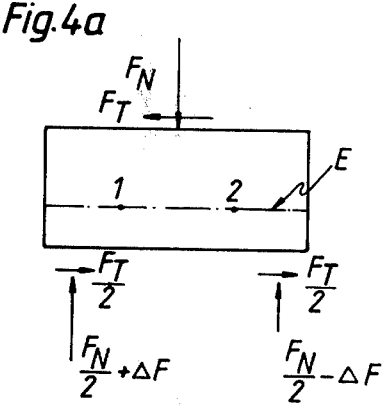
FIG. 4a shows the sum of the forces in FIGS. 2a and 3a, which corresponds to the load according to FIG. 1.
Figure 4B:
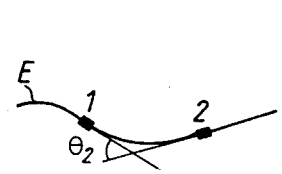
Figure 4C:
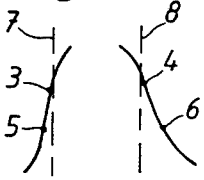

FIG. 1 shows short beam 10, which in this exemplary case is the shaft of one or more rope pulleys in a lifting device for cranes, hoists and the like, which is placed on two equal supports 11, 12 and loaded by force F. The force is assumed to be applied at a certain angle $\alpha$, and is divided into component $F_N$ perpendicular to the shaft and component $F_T$ parallel to the shaft. The point of action of the force is assumed to lie symmetrically with respect to the supports. This load is shown in FIG. 4a, in which also elastic line E has been drawn. In FIG. 4b the deformation of arbitrarily chosen elastic line E is shown on an exaggerated scale. This deformation may be divided into a symmetrical and an anti-symmetrical deformation, as shown respectively in FIGS. 2b and 3b. If the angle $\theta_0$ in FIG. 2b between tangents 13, 14 at points 1 and 2 is utilized as a measure of force component $F_N$, only the symmetrical deformation contributes to the measuring signal. Angle $\theta_1$ in FIG. 3b is zero because of the anti-symmetrical deformation. Points 1 and 2 on elastic line E have been chosen symmetrically with respect to the point of application of the force. It is clear from the above that angle $\theta_2$ in FIG. 4b becomes: $\theta_0 + \theta_1 = \theta_0$, i.e. it becomes independent of lateral force $F_T$.

Figure 5:
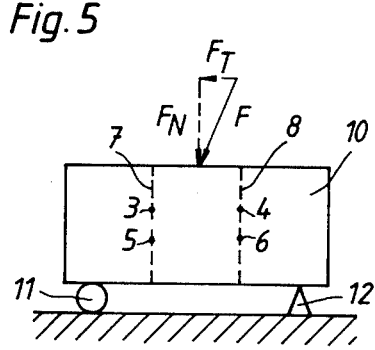
FIG. 5 shows the shaft on two supports, one of which is unable to adopt to lateral forces.
Figure 6A:
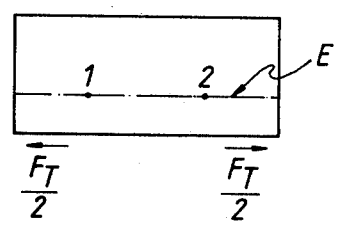
FIG. 6a shows the forces which are caused by the fact that one support (in FIG. 5) does not take up lateral forces.
Figure 6B:
Figure 7A:
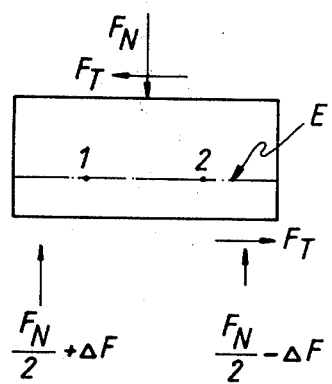
FIG. 7a shows the sum of the forces from FIGS. 4a and 6a, which corresponds to the case according to FIG. 5.
Figure 7B:
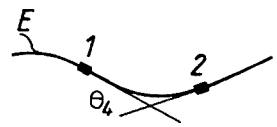
Figure 7C:
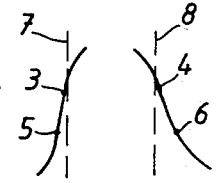

If one of the supports 11, 12 is unable to take up forces in a lateral direction, the whole lateral force $F_T$ must be taken up by the other support, as shown in FIG. 5. The loading which then arises is shown in FIG. 7a. In the same way as for FIG. 1, the load may be divided into symmetrical and anti-symmetrical parts. It now contains a symmetrical component according to FIG. 6a, which provides a contribution $\theta_3$ to the signal. The signal now becomes: $\theta_4 = \theta_0 + \theta_0 + \theta_3$, since $\theta_1 = 0$ according to the above.

Computer calculations and measurements on a shaft with a diameter of 75 mm and a distance of 90 mm between the supports, which is loaded with $F_N = 6250$ kg and $F_T = 0.07$ $F_N$, approximately results in $$0.02 < \theta_3/\theta_0 < 0.03$$

that is, the lateral force $F_T$ results in an error of 2 to 3%.

Figure 2C:
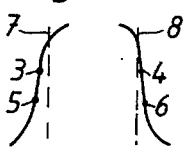
Figure 3C:
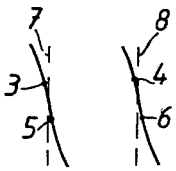
Figure 6C:
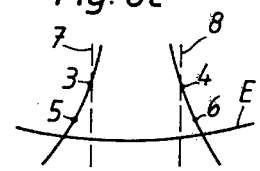

However, if force $F_N$ is measured by employing the difference between the strains at points 3, 4 and 5, 6, located symmetrically at cross-sections 7, 8 in the shaft as shown in FIG. 5, an error results in the measurement of the load (according to FIG. 6a), which is approximately six times greater. The fact that the error becomes greater in such a measuring method is clear from FIG. 6c which shows the curvature of cross-sections 7, 8 together with the curvature of elastic line E. As stated above, only the symmetrical load contributes to the measuring signal according to FIG. 2c, whereas according to FIG. 3c the anti-symmetrical load does not contribute. FIG. 6c shows that the cross-sections are deformed to a considerably greater extent than elastic line E, since the load in FIG. 6a is directed in the same direction as the deformation of the cross-sections, but perpendicularly to the deformation of elastic line E.

Another advantage of measuring the angle between two tangents of an elastic line according to the invention is that the sensitivity to changes at the contact surface between the supports and the beam, as well as a change in the point of application of the force, are considerably smaller than when measuring the cross-section curvature. As an example, in the previously mentioned shaft with a diameter of 75 mm and with 90 mm between the supports, an alteration of the distance between the supports of 6% when measuring the deformation of an elastic line results in an error of about 6%, whereas measurement of the cross-section curvature results in an error of about 25%.

Figure 8:
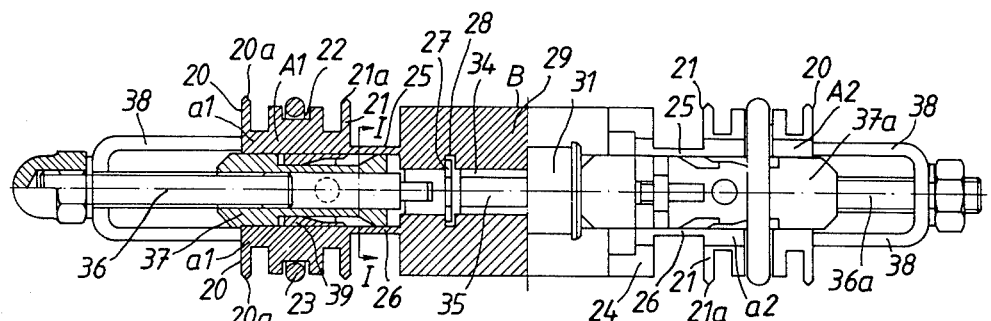
FIG. 8 shows a top view in partial section of a transducer designed for carrying out the measuring method of the invention.
Figure 9A:
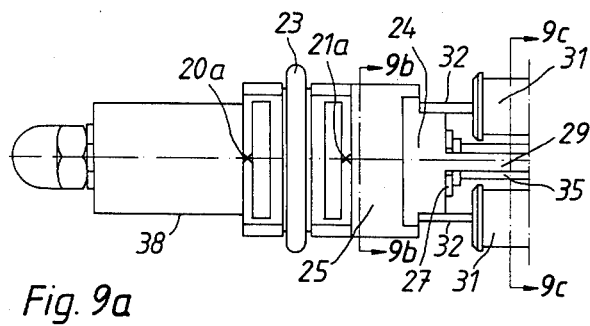
FIG. 9a shows a side view of the left-hand portion and the center of the transducer according to FIG. 8.
Figure 9B:
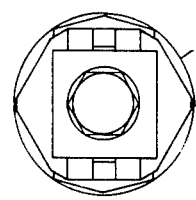
FIG. 9b shows an end view of the transducer.

A transducer designed to carry out the method is shown in FIG. 8. The transducer consists of two expansible attachment parts A1, A2 and a measuring part B arranged between the attachment parts. Attachment part A1 is shown in section, but the remainder of FIG. 8 is a top view of the transducer. Attachment part A1 consists of two equal halves a1 which, at their respective ends, are provided with attachment elements 20, 21 which are resilient in the longitudinal direction of the transducer and each consisting of two symmetrical, substantially triangular thin discs with tips shaped as hardened points 20a, 21a. Between attachment elements 20, 21 there is groove 22 for retaining elastic ring 23, for example an O-ring. When installing the transducer, O-ring 23 guides the transducer centrally in hole D (shown in FIG. 9a) in the previously mentioned shaft, the hole being bored axially through the shaft. Each half a1 of attachment parts 20, 21 is connected to fixing plate 24 in measuring part B by means of thin beams 25 and 26.

Figure 9C:
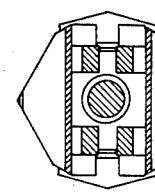
FIGS. 9c and 9d show cross-sections through the transducer of FIG. 9 in respective planes 9b—9b and 9c—9c, respectively.
Figure 9D:
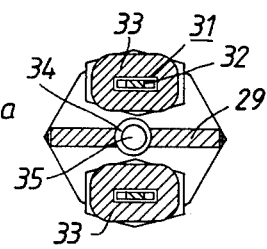

Measuring part B is constructed to two fixing plates 24, one at each end of the measuring part. Fixing plates 24 are connected to one another by web 29, formed as a plate, the width of which is clearly apparent from FIGS. 8 and 9c, and the thickness of which is evident from FIGS. 9 and 9c. Two force-sensing members 31 are arranged between fixing plates 24 in a plane perpendicular to web 29. Force-sensing members 31 consist of bar 32 of a magnetostrictive material which is attached by its ends to the respective fixing plates 24, for example by welding. Bar 32 is surrounded by one or more coils 33 for generating a magnetic flux in the bar and for sensing the changes in the flux which arise therein when it is subjected to the influence of a mechanical force. Alternatively, force-sensing members 31 may consist of strain gauges which are bonded to similar bars to those described.

Axial hole 34 for receiving a continuous turning rod 35 extends centrally through measuring part B. Turning rod 35 is axially fixed by means of slot ring 27 mounted in slot 28 in web 29 without preventing the rotation of the turning rod in the hole. At its ends turning rod 35 is non-rotatably connected to screw 36 which is threaded through wedge member 37, and which runs freely through clamp 38, the ends of which make contact with attachment part A1. Wedge member 37 is displaceably arranged in attachment part A1 where it cooperates with second wedge member 39 fixedly connected to the attachment part. The two wedge members 37, 39 are designed and arranged so that when screw 36 is rotated, first wedge member 37 is displaced with respect to second wedge member 39 and causes the two halves a1 of attachment part A1 to be pressed apart. In this movement, points 20a and 21a are pressed into the drilled wall and secure the transducer in the hole of the shaft. With a continuous rotation of turning rod 35 the arrangement causes the two attachment parts A1, A2 to become locked simultaneously and to substantially the same degree.

At the right-hand end of the transducer, shown in FIG. 8, there is arranged a corresponding second wedge member 37a internally threaded and arranged on screw 36a. Screws 36 and 36a are threaded in opposite directions. When screw 36 is rotated, for example, in a clockwise direction, wedge member 37 is moved to the left and presses apart the halves a1 of attachment part A1. The rotating motion of screw 36 is transferred by turning rod 35 to screw 36a so that both screws rotate in the same direction. However, since screw 36a is threaded in the opposite direction, wedge member 37a moves to the right and presses apart the halves a2 of attachment part A2 in the same way as halves a1 of the attachment part A1 at the left-hand end of the transducer.

Figure 10:
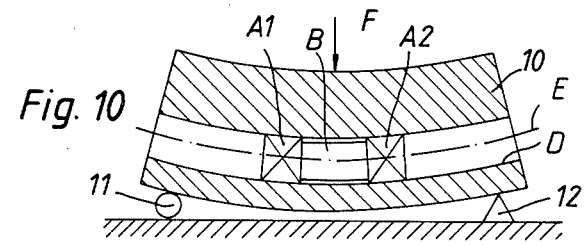
FIG. 10 shows a section, with greatly exaggerated deformation, through the shaft in FIG. 5, the transducer and the shaft being subjected to the influence of a force.

FIG. 10 shows schematically how beam 10 according to FIG. 5 is provided with axially bored hole D in the lower part of a beam. A transducer A1, B, A2 is positioned in the hole symmetrically with respect to the influencing force F. The transducer is clamped by means of attachment parts A1 and A2 as described above. When attaching the transducer it is oriented in such a way that web 29 is perpendicular to force F. The two attachment parts A1, A2 follow the angular change of elastic line E in the drilled wall which touches the hardened points of attachment parts A1, A2. By combining the output signals from two force-sensing members 31, the previously stated angle $\theta_0$ can be determined, and thus also the desired force $F_N$.

We claim:

1. A method for measuring the resultant normal component of loading forces acting substantially perpendicular to the longitudinal axis of machine elements, comprising the steps of:
   inserting and clamping a transducer in a continuous hole extending substantially along the longitudinal axis of the machine element so that the tangential points of two tangents of an elastic line in the wall of said hole are located symmetrically with respect to a symmetry plane of the loading forces; and
   measuring the change of the angle between said two tangents.

2. A transducer for measuring the resultant normal component of loading forces an machine elements, comprising:
   a measuring part including two ends;
   two expansionable attachment parts each being attached to a respective end of said measuring part and each including means for securing the transducer in the hole within the machine element such that said measuring part extends substantially parallel to the longitudinal axis of the machine element; and
   a pair of spaced thin beam elements interconnecting a respective one of said attachment parts to said measuring part, each said pair of thin beams being substantially rigid in the direction of said resultant normal force and resiliant in the direction perpendicular thereto.

3. A transducer according to claim 2 wherein each of said attachment parts consists of two equal half portions, each said half portion being connected to the measuring part by means of said thin beam and each said half part including two attachment elements spaced axially with respect to each other and each being resiliant in the longitudinal direction of the transducer, each said attachment element including two symetrical substantially triangular thin disks each including hardened point at the tip angles of said triangle for engagement with the inner walls of said hole, a groove between said attachment elements, and a ring of plastic material mounted within said groove for guiding said transducer within said hole to position the transducer therein.

4. A transducer according to claim 3 wherein said measuring part includes two fixing plates axially spaced from each other and a web mounted therebetween for mechanically fixing said fixing plates, and a pair of spaced force sensing members mounted to each of said fixing plates.

5. A transducer according to claim 4 wherein each of said force-sensing members includes a bar of magnetostrictive material attached to each of said fixing plates and including windings for generating a magnetic flux in said bar and for sensing the changes in said flux occuring therein when subjected to the influence of a mechanical force, the remainder of said measuring part being made of ferromagnetic material.

6. A transducer according to claim 4 wherein each of said force-sensing members are strain gauges.

7. A transducer according to claim 3 further comprising rotatable means extending through said attachment parts and said measuring part, and wherein each said attachment part includes wedge means for separating said half-portions upon a particular rotation of said rotatable means to cause each said two attachment elements to engage the inner wall of said hole and retain said transducer therein.

8. A transducer according to claim 2 wherein said measuring part includes two fixing plates axially spaced from each other and a web mounted therebetween for mechanically fixing said fixing plates, and a pair of spaced force sensing members mounted to each of said fixing plates.

9. A transducer according to claim 8 wherein each of said force-sensing members includes a bar of magnetostrictive material attached to each of said fixing plates and including windings for generating a magnetic flux in said bar and for sensing the changes in said flux occuring therein when subjected to the influence of a mechanical force, the remainder of said measuring part being made of ferromagnetic material.

10. A transducer according to claim 8 wherein each of said force-sensing members are strain gauges.

* * * * *